May 3, 1966 M. GINZBURG 3,249,368
AMBULATING DEVICE FOR PARAPLEGICS
Filed June 24, 1964 3 Sheets-Sheet 1
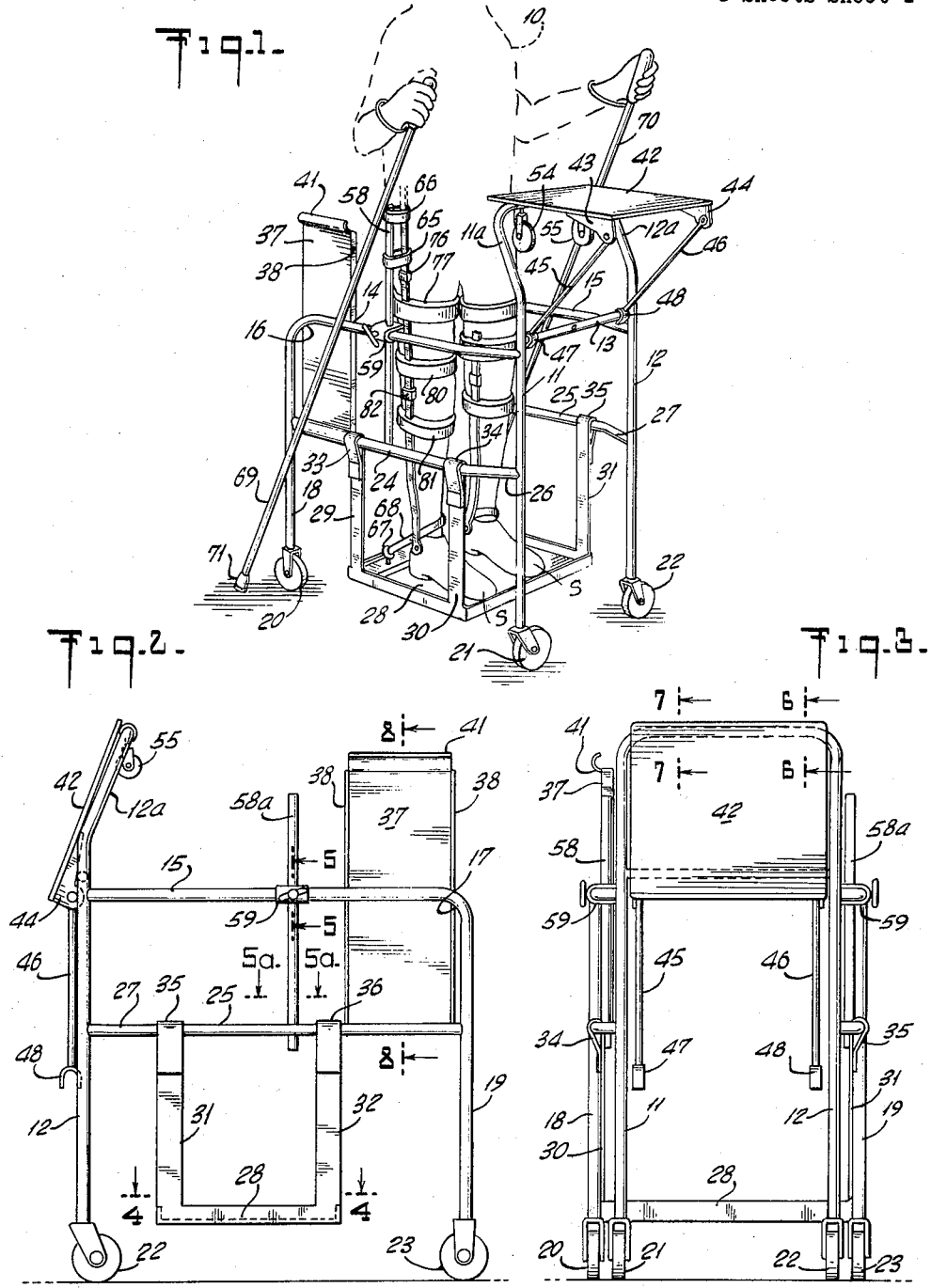
INVENTOR
MEJER GINZBURG
BY
Hopgood & Calimafde
ATTORNEYS May 3, 1966 M. GINZBURG 3,249,368
AMBULATING DEVICE FOR PARAPLEGICS
Filed June 24, 1964 3 Sheets-Sheet 2
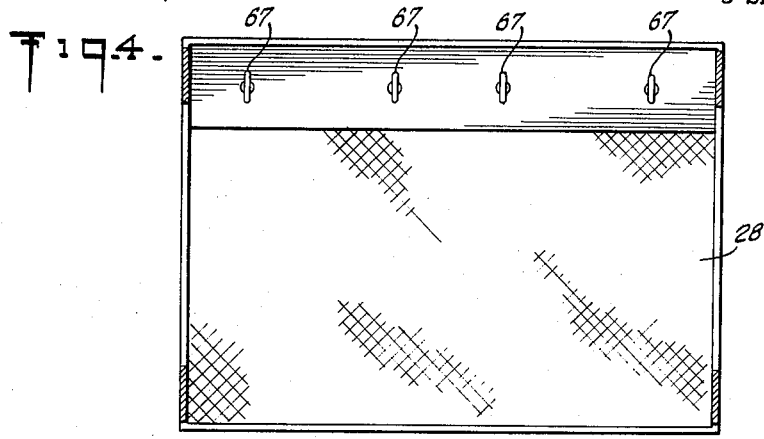
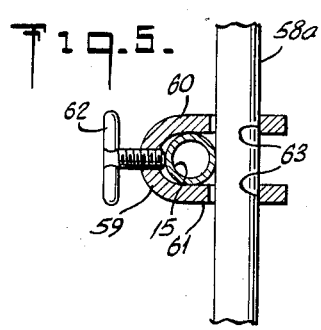
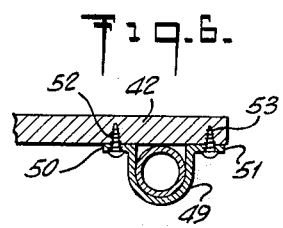
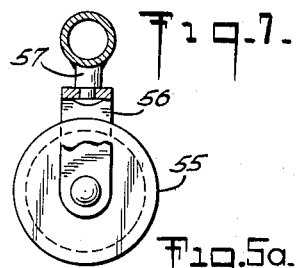
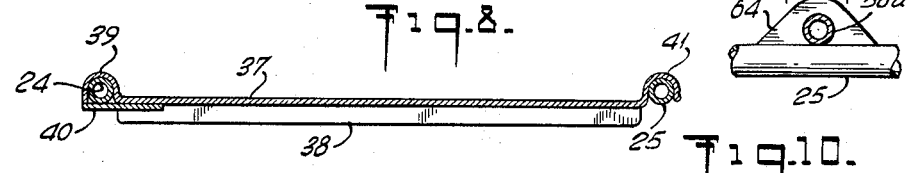
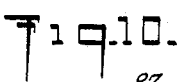
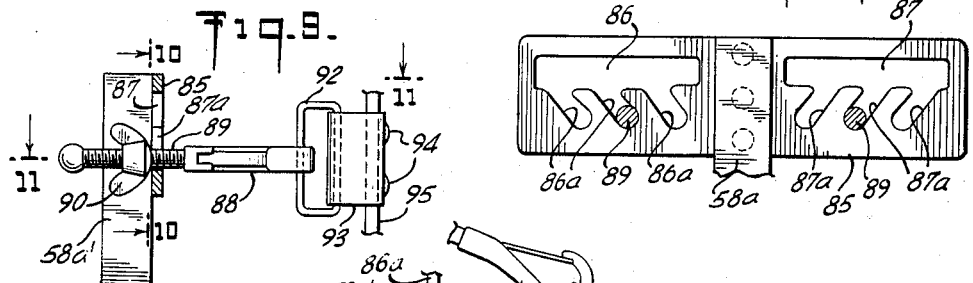
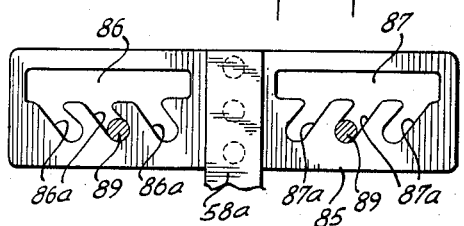
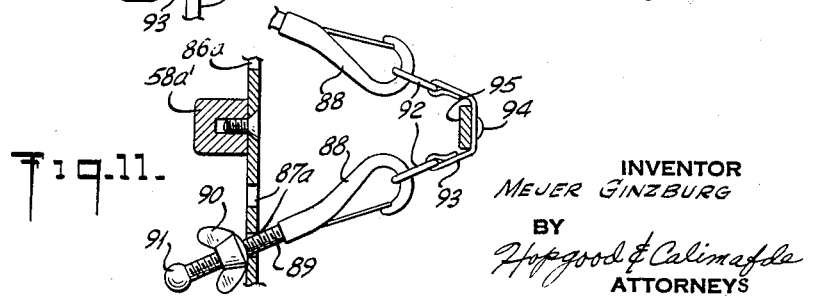
INVENTOR
MEYER GINZBURG
BY
Hopgood & Calimafde
ATTORNEYS May 3, 1966 M. GINZBURG 3,249,368
AMBULATING DEVICE FOR PARAPLEGICS
Filed June 24, 1964 3 Sheets-Sheet 3
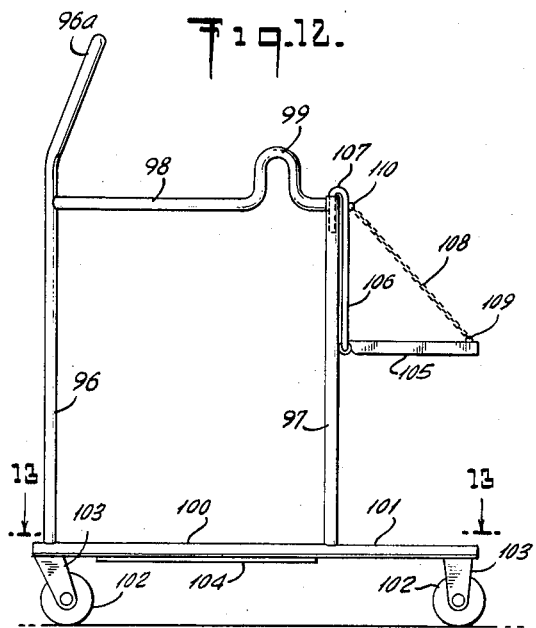
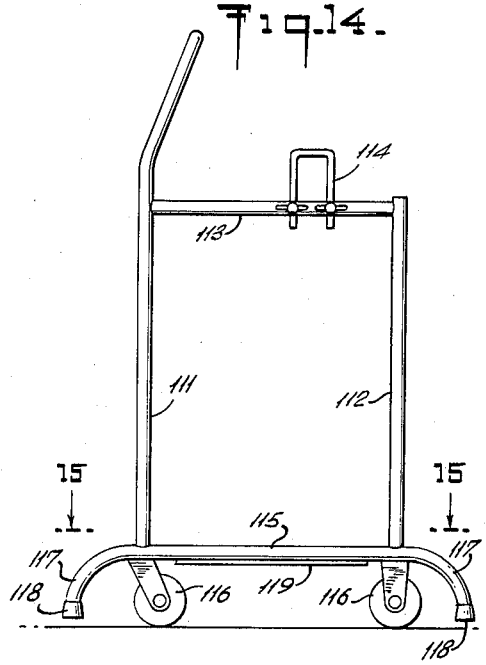
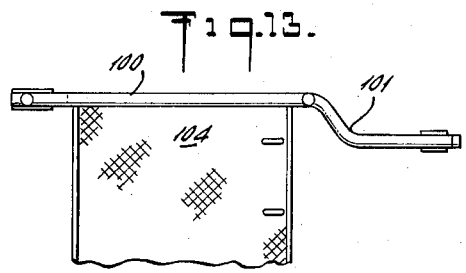
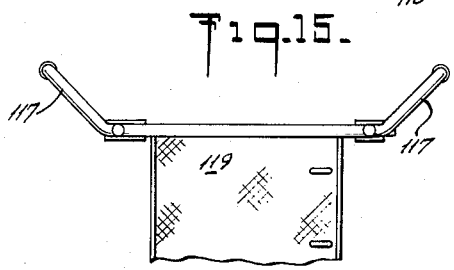
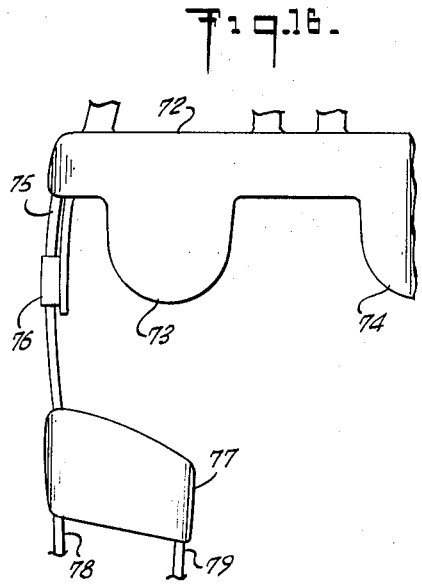
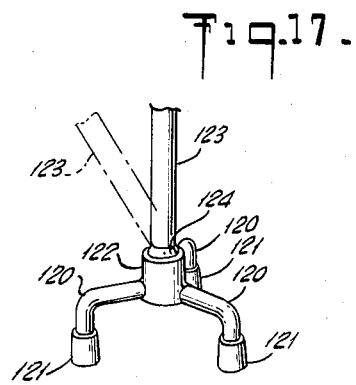
INVENTOR
MEJER GINZBURG
BY
Hopgood & Calimafde
ATTORNEYS United States Patent Office 3,249,368
Patented May 3, 1966

3,249,368
AMBULATING DEVICE FOR PARAPLEGICS
Mejer Ginzburg, Brooklyn, N.Y., assignor to New York University, a New York educational corporation
Filed June 24, 1964, Ser. No. 377,623
7 Claims. (Cl. 280—219)

This invention relates to an ambulating device for facilitating the mobilization in the erect position of incapacitated persons, such as paraplegics, through the use of their own motive power.

Paraplegics who are immobilized in the horizontal position are generally predisposed to certain physical complications because of the immobilized position and also to the development of decubiti, skin sores, ulcers, and the like, which appear on body parts which undergo pressures, especially over bony prominences, for example in the sacral and/or pelvic regions. When they develop in a patient, bracing of the patient is usually postponed for the reason that the braces may exert pressure and compound the existing condition. Being without braces, the patient is unable to stand up and he is forced to stay in bed or on a stretcher. The healing process of the decubiti, therefore, is usually extremely slow. Frequently, this leads to a vicious cycle wherein the patient is forced to stay in a horizontal position in bed or on a stretcher for extended periods of time, usually in the prone position, such that the patient is predisposed to new decubiti, and as a result, many paraplegics spend years in bed or on a stretcher with attendant complications.

Much has been written by authorities in the field on the serious pathological changes which develop in a patient restricted to a horizontal position. The authorities are in general agreement that in order to minimize or interrupt the formation of decubiti, the patient should be reactivated or mobilized in the upright position as early as possible. Methods proposed have included using a tilt table or braces with locked joints. However, with the latter, ambulation is only possible when the braces with locked joints are used in conjunction with parallel bars or crutches. Unfortunately, both of the foregoing methods have their limitations and are quite often inefficient for the following reasons:

The tilt table is available only in institutions and generally to a very limited extent for each patient on intermittent days for short periods of not more than, for example, 30 minutes. Moreover, the table requires the assistance of at least two aides. The patient is completely immobilized, with occasional minimal activity, but for the most part idle and bored. In addition, the table has no immediate vocational or social benefits. As a result, the tilt table is used transitionally for reconditioning the cardiovascular system by attaining an upright position or until bracing is available and the patient is able to use them.

The drawbacks of bracing are somewhat different at the early stages of disability and in later stages. However, in both stages the difficulties are principally due to the very high energy expenditure which ambulation in braces requires. In the early stages of incapacitation, the use of braces is often delayed, because the patient has not yet acquired the necessary strength in his upper extremities for "push-ups" between parallel bars generally necessary in order to lift his inert body together with the heavy bracing. In addition, the patient is lacking in body balance and endurance so that the training in braces thereafter is generally very slow because of the high energy cost involved. Even when the paraplegic has learned to ambulate in braces with crutches, the extremely high energy expenditure limits proficiency, purposefulness and practice value, since the patient is only able to cover very short distances. Statistics have shown that patients trained in that way often lose motivation and discard their braces as soon as they are discharged home. Having thus discarded the braces, the paraplegic is again immobilized in a sitting of horizontal position with the attendant grave consequences. Generally, he is soon rehospitalized because of new decubiti or the onset of other complications.

In summary, it can be stated that the available rehabilitation techniques for the mobilization of paraplegics in the erect position have not been efficient, especially for early mobilization. As a result, the paraplegic is forced to remain most of the time in a sitting or lying position, either of which may result in the development of a vicious cycle or decubiti. The ultimate result is very often prolonged hospitalization, frequent rehospitalization, increased cost of treatment, and total or partial prevention of vocational rehabilitation with accompanying detrimental social and psychological sequelae.

With my invention, I provide an improved ambulating device which overcomes the difficulties inherent in pre-existing techniques.

It is an object of my invention to provide an ambulating device for facilitating the early mobilization in the erect position of braced incapacitated persons, such as paraplegics.

Another object is to provide an improved ambulating device by which a braced paraplegic can be easily supported in a balanced upright position while maintaining the hands free for use in moving the device with minimal energy expenditures by means of poles, such as in skiing; or when not moving his hands are free for working in standing position when the situation requires it.

Still another object of my invention is to provide a device for aiding and accelerating the pyhsical and vocational rehabilitation of a paraplegic by preventing decubiti and other complications. The vocational rehabilitation opportunities are enlarged because the device enables the patient to work in a standing position should it be required.

These and other objects will more clearly appear when taken in conjunction with the following disclosure and the accompanying drawings, wherein:

FIG. 1 depicts in perspective one embodiment of the ambulating device provided by the invention as employed in combination with the locked braces of a patient;

FIGS. 2 and 3 show in side and front elevation, respectively, the ambulating device of FIG. 1;

FIG. 4 is a plan view of the platform as seen in the direction of arrows 4—4 of FIG. 2, the platform being serrated to provide friction against the shoes of a patient;

FIGS. 5, 5a, 6, 7 and 8 are sections taken from FIGS. 2 and 3 along lines 5—5, 5a—5a, 6—6, 7—7 and 8—8 as shown;

FIG. 9 is illustrative of one embodiment of a means for coupling a locked brace to the side of the ambulating device;

FIGS. 10 and 11 are details of construction of the embodiment of FIG. 9 as viewed along lines 10—10 and 11—11, respectively, of FIG. 9;

FIG. 12 is a side elevation of another embodiment of an ambulating device provided by the invention;

FIG. 13 is a partial plan view of the platform of the device of FIG. 12 taken along line 13—13;

FIG. 14 depicts in side elevation still another embodiment of the ambulating device provided by the invention;

FIG. 15 shows in partial plan view the platform of the device of FIG. 14 as viewed along line 15—15;

FIG. 16 is illustrative of a brace-connected pelvic band showing two asymmetrically located pressure pads or butterflies adapted to apply pressure to selected posterior portions of the patient while avoiding pressure on sacral decubiti; and FIG. 17 depicts one embodiment of a terminal portion of a pole for use by the patient in pushing himself about on the device.

In its broad aspects, I provide an ambulating device for facilitating the mobilization and the physical rehabilitation of paraplegics in the erect position comprising a rigid framework of upright and transverse structural elements supported at the bottom by casters. The framework has a leading end which the patient faces while standing within the framework and a trailing end through which the patient has mounting access to the device. The device has a platform at substantially the bottom thereof supported, for example, about 4 inches from the floor and inwardly of the casters. A seating element is provided associated with the trailing end of the device pivotally connected at one of its ends to one side of the frame and having hook-like means at its other end for swingably engaging it to the opposite side of the frame. A lap board or table top is adjustably mounted on the frame of the leading end of the device, the board being adapted waist high to swing from a vertical storing position to a fixed horizontal working position. Means are provided at each of the sides of the device for locking each of the leg braces thereto, and means on the platform for anchoring the shoes of the patient against movement. To facilitate movement of the wheeled device, poles are provided for use by the patient much in the same fashion as in skiing, for example rubber-tipped poles.

As to the foregoing and other details of construction, reference is made to FIGS. 1 to 3 which show one embodiment of my invention. Referring first to FIG. 1, a patient 10 is phantomly shown supported within the ambulating device comprising a framework of structural elements, the device having a forward or leading end formed of an inverted U-shaped structural member having downwardly extending front legs 11 and 12 of tubular metal, the legs near the "U" or front railing portion being slightly offset from the vertical at 11a and 12a, respectively. A front cross member 13 is provided connected at its ends to legs 11 and 12. The connection may be by means of a weld, a "T," or by having the ends of the cross member enter the hollow of the legs.

Side cross members are similarly connected to each of legs 11 and 12 to provide an integrated self-supporting framework. In the embodiment shown in FIGS. 1 to 3, a pair of side cross members or railings 14 and 15 is provided bent at substantially right angles at 16 and 17 (note also FIG. 2) to provide downwardly extending legs 18 and 19. Thus, four vertical tubular legs 11, 12, 18 and 19 are provided with casters 20, 21, 22 and 23 fitted to their ends as shown. To further insure a rigid framework, additional side cross members 24 and 25 are provided of tubular structural metal, cross member 24 being similarly connected between legs 11 and 18 and cross member 25 between legs 12 and 19, each of the side cross members bending slightly inwardly towards each other at 26 and 27 such that legs 11 and 12 and casters 21 and 22 (note FIG. 3) are closer together at the leading end than legs 18 and 19 and casters 20 and 23 which are relatively wider apart at the trailing end. Having casters 21 and 22 closer together helps in assuring ease of maneuverability of the ambulating device.

A platform 28 is provided suspended, for example, about 4 inches from the floor by four metal straps 29, 30, 31 and 32, the straps being welded or riveted at their ends to the platform and then wrapped or bent about cross members 24 and 25 at 33, 34, 35 and 36 and each end lap welded or riveted to itself (note FIG. 3).

In order to adapt the device for sitting, a seating element 37 of sheet metal or other material is provided at the trailing end with one end swingably or pivotally mounted near the end of cross member 24 (note FIGS. 1, 2 and 8). The sheet metal is bent or flanged at its sides to provide stiffening members 38 (note FIG. 8) so as to insure a rigid seat. The ends of the seating element are bent in the shape of a "U" having a radius of curvature conforming substantially to cross members 24 and 25. One end 39 (FIG. 8) is permanently pivoted about cross member 24 by means of an element 40 welded to the bottom of seat 37 while the other end 41 is adapted to nest on cross member 25 when seat 37 is swung about its pivot. When the seat is in the raised position shown in FIG. 1, the device is accessible by the patient with the help of an attendant from the trailing end.

The leading end of the device may be provided with an adjustably mounted lap board or table top, for example, as illustrated in FIGS. 1 to 3 which show a kind of table top pivotally mounted at the U joining the two legs 11 and 12. The table top may be made of any suitable material, such as wood. As shown in FIG. 1, the table top has a pair of ears 43, 44 to each of which is pivotally connected truss supports 45, and 46, respectively, which terminate in U-shaped clamping members 47 and 48 shown clamped against cross member 13. By merely disengaging truss members 45, 46 from cross member 13, the table top 42 can be dropped as shown in FIGS. 2 and 3. The detail of the pivot or swivel mounting of the table top is illustrated in FIG. 6 which is a cross section taken along line 6—6 of FIG. 3. The swivel is effected by means of at least a pair of metal straps bent about the tubular member and fastened beneath the bottom of top 42. In FIG. 6 this is shown by U-shaped metal strap 49 fastened at flanges 50 and 51 to board 42 by means of screws 52 and 53. It may be desirable, though not necessary, to have a pair of pulleys 54, 55 fastened to the underside of the tubular metal as shown in FIG. 1 and in more detail in FIG. 7 which shows pulley 55 supported by yoke 56 which in turn is welded via supporting shank 57 to the tubular member. The use of the pulleys will be explained later.

In supporting a patient in the erect position on platform 28, side locking means are provided on each side of the framework comprising vertical members 58 and 58a mounted transverse of cross member 24 and railing 14 on one side and transverse cross member 25 and railing 15 on the other side. Referring to FIGS. 1, 2, 3 and 5, vertical members 58 and 58a are shown extending from the cross members to the railings and fixed to the railings by means of a U-shaped clamp 59, the legs 60, 61 of which (FIG. 5) embrace the railing, a winged bolt 62 being provided for tightening the clamp against the railing. As shown in FIG. 5, vertical member 58a passes through openings 63 of the legs of the clamp. The lower end of each vertical member passes through an ear projecting laterally from the lower cross member, such as shown in FIG. 5a, which depicts ear 64 projecting laterally from cross member 25 and through which vertical member 58a passes. The thus supported vertical members 58 and 58a project upwardly waist high longitudinally of the lateral bars of the braces of the patient, the lateral bars of the braces of the patient being coupled to the vertical member (note FIG. 1) by means of straps 65 and 66 as shown. Means 67 are provided on platform 28 (FIG. 4) for connecting feet restraining means or straps 68 (FIG. 1) about the feet of the patient to avoid slipping during mobilization. In addition, the surface of the platform is serrated to provide a friction surface for the sole of the shoes.

As shown in FIG. 1, the patient indicated phantomly by the numeral 10 is supported in the erect position via his adjusted braces, the knee and hip joints being locked and the lateral uprights of the long leg braces firmly attached by straps to the vertical bars mentioned hereinbefore. The feet of the patient are also immobilized on the platform with straps to prevent slipping.

In this position the patient stands firmly on the platform and does not need to use his hands to hold on to lateral rails 14 and 15 for stability. Both hands are free for any use as in any normal person. The patient pushes the device, using two poles 69, 70 (one in each hand), like those used in skiing, but with rubber tips 71 on the ends, such as suction cups.

The swinging lap board or table top 42, when adjusted in the horizontal position, adds to the rehabilitation of the patient in providing means for writing, reading, working, prevocational exploration and vocational training. The folding seat 37 can be used by the patient to sit down, if necessary, for a short period of time for the purpose of lifting up and decongesting his legs after long periods of standing in the erect position. In this connection, the two pulleys 54 and 55 are provided to enable the patient to lift his legs. This is achieved by securing a rope, for example by hooks or other securing means, to each of the stirrups at the feet of the patient and passing each of the ropes over the pulleys and tying them within easy reach of the patient at vertical bars 58, 58a. Thus, when a patient is ready to sit, the locks on the hip and knee joints of the braces are loosened, allowing the patient to assume the sitting position. Straps 68 are disconnected and then the patient pulls on the ropes passing over the pulleys, thereby raising his legs to the horizontal position for say 5 to 10 minutes or more until decongestion occurs.

In fitting a patient with a pre-existing condition of decubiti to the ambulating device, it is important that the braces be either readjusted or prescribed to eliminate any pressure upon the decubiti. As generally a pelvic band is empoyed around the pelvis and is connected by locking means to the leg braces, care must be taken to assure correct pressure distribution about this part of the body. In the case where the patient has an aggravated condition of sacral decubiti, it is important that the pressure from the pelvic band be transferred to two individually designed pressure pads or "butterflies" asymmetrically arranged as shown in FIG. 16 which depicts pelvic band 72 with padded butterflies 73, 74 asymmetrically positioned if necessary relative to the sacral region of the patient, the pelvic band being connected on each side thereof to the leg braces via longitudinal structural element 75, hip locking means 76 to cuff (or band) 77 which surrounds the lower extremity about the thigh, the collar having extending downward therefrom side brace elements 78, 79 through additional bands (or cuffs), one above and one below the knee, cuffs 80 and 81 (note FIG. 1), and terminating at the feet as shown, a lock 82 being also provided at the knee. The leg braces terminating at the feet are connected to shoes "S" as shown in FIG. 1. By having the butterflies located asymmetrically, pressure is minimized on the sacral decubiti by transferring the unavoidable pressures of the bracing to neighboring areas of sound skin, thus widening the pressure area as much as possible so as to create minimal pressure over each square centimeter of skin. For other body parts with decubiti, doughnuts or other similar padding may be used to eliminate pressure of the metallic parts of the braces, if any.

In an actual case, a patient was treated in accordance with the technique of the invention. This patient had spent some seventeen years on and off a stretcher in the prone position and had recurrent decubiti, especially over the sacral area. The braces were readjusted and a pelvic band added with modifying structural changes. Because of the tremendous scar and decubiti, the pressure was taken off the whole posterior part of the pelvic band and transferred to two asymmetrically located butterflies while avoiding pressure over the decubiti scar area.

The patient was successfully placed in a standing position in his adjusted braces in the ambulating device with good erect posture. After a short period of training, he was able to move around easily and swiftly throughout the hospital, using the poles as described above. He was able to sit down and to decongest his lowers. He was able to maintain balance and stability. He could move around for 30 minutes without getting tired. No damage was caused to his skin by the braces. While using the invention, all the decubiti healed. Tests proved that moving about in the ambulating device required much less energy expenditure than with prior techniques.

In utilizing the device, the patient pushes down on two inclined poles as in skiing. Pushing forces are then transmitted from the ground through the poles to the upper extremities, shoulders, trunk, and lower extremities of the paraplegic. From these points the same forces activate friction forces between the soles of the patient's feet and the platform on which he stands, as well as tension forces in the attachments between the lateral uprights of the patient's braces and the lateral vertical bars of the ambulating device. Since the whole body, including all of its muscles, joints and bones are located between the primary ground forces and the ultimate moving forces (friction and tension mentioned above), it is apparent that all of the functional muscles of the body are forced to participate and exercise while "skiing" in the device. The weight of the patient's body, his braces, and the device, all pushed by the poles, create the necessary resistance for proper resistive exercises for all of the involved muscles. Most of the trunk muscles, which are forced to keep the trunk stabilized while "skiing," will receive repeated short maximal isometric exercises, which are known to be very effective. The resistance created by the above factors (weights) will increase in different situations; namely, in right and left turns, at the start of "skiing," as well as if the angle of the pole to the ground becomes less acute. All this creates many opportunities for every functioning muscle in the body to receive resistive exercises and proper re-education; the disused muscles are in this way reconditioned. In addition, both the upper extremities and shoulder girdles' musculature, latissimus dorsi muscle and the abdominals, may especially benefit (if they are still functional) and this may lead to a considerable reduction in bracing at a later date.

On the other hand, the ambulating device affords an opportunity for continuous balancing in a free and independent manner to the whole upper part of the trunk which is situated above the level of the paralysis. This is facilitated by the fact that the paraplegic in the device does not immobilize his trunk as he would if his hands were holding on to parallel bars. His hands are free, and therefore the upper part of his trunk is also free. Nevertheless, there is some minimal mobility in the attachments between the braces and lateral vertical bars of the device, as well as some "swaying and floating" of the body inside the braces. This "free" position forces the body to balance (while "skiing" in the device) to a minimum extent even low inside the braces (if there is still some part functional), to a greater extent inside the upper part of the braces and completely free above the braces.

As will be appreciated, various modifications of the device may be employed without departing from the scope of the invention. For instance, the means for connecting the braces to the sides of the ambulating device may comprise a combination wing nut and bolt having a snap hook at one end thereof. By way of example, one modification is shown in FIGS. 9 to 11. In FIG. 9, a vertical member 58a', corresponding to vertical member 58a of FIG. 2, is shown having integral therewith a wing 85 having openings 86, 87 communicating with locking slots 86a and 87a, respectively. The bolt and snap hook locking means is shown more clearly in FIG. 11, wherein a pair of snap hooks 88 is shown, each connected to a bolt 89 having a wing nut 90, the bolt terminating in a stop 91. By slipping the bolt and hook through openings 86 or 87 and setting it down in one of the slots, each of the snaps 88 can then be hooked to rings 92 connected to strap 93 riveted at 94 to brace 95. The brace can be anchored rigidly to the sides of the ambulating device by merely tightening wing nut 90 on each of the bolts.

As will be apparent from FIGS. 12 to 15, the ambulating device may take various forms. The embodiment shown in FIGS. 12 and 13 is particularly useful in that it provides ease of accessibility to the device or exit therefrom. This is achieved by designing the bottom of the framework at the trailing end with a rearward extension so that the device can be wheeled up to wheel chair or bed. In this way, the platform is brought very close to the wheel chair or bed. The device in FIG. 12 is shown in side view comprising vertical members or legs 96, 97 similar to legs 11, 12 of FIG. 1, it being understood that the other side of the frame has similarly designated members. A railing 98 is provided at each side of the device having an offset portion 99 of corresponding size sufficient for use in making a connection with the braces of a patient as described in FIG. 1 and FIGS. 9 to 11. The lower or bottom portion of the framework has a cross member 100 connected across the bottom ends of members 96 and 97, the cross member extending rearward of the trailing end of the frame via its extension 101 as shown. Extension 101 which is the same on both sides of the frame, may project straight as extension of 100 or inwardly thereof as appears in FIG. 13, or, if desired, it may project outwardly of the frame. Casters 102 are similarly mounted at the bottom of the framework via yokes 103 connected to cross members 100 and 101. Vertical member 96 is offset slightly at 96a and continues to the other side of the frame as a U-shaped member similarly as in FIG. 1.

A platform 104 is provided connected between cross members 100 as shown partially in the plan view of FIG. 13. As in FIG. 1, a lap board may be provided for use with the leading end of the device. Likewise, a seat 105 may be provided having support extensions 106 pivotally mounted on each side thereof with hooks 107 for insertion into the hollow end of leg 97, a pair of chains 108 being provided at each side of the seat for supporting it in the horizontal position via hook and eye means at 109, 110. The seat can be completely removed from the frame by merely lifting hooks 107 out of the hollow of tubular legs 97. Thus, as the patient backs up the device to his bed, extension 101 moves under the bed and brings the posterior of the patient to the edge of the bed so that he can leave the device with little or no help by an attendant, or enter it whatever the case may be. Similarly, 101 will go beneath the wheel chair and respectively laterally or medially to the casters of the wheel chair. The latter depends on the distance provided between 101 bilaterally. The shape in FIG. 13 will allow 101 to enter the space below the wheel chair medially to the casters. In this way the platform 104 will reach easily the feet of the paraplegic in wheel chair and he will be able without any assistance to enter or leave the ambulatory device.

In FIGS. 14 and 15, a more compact unit is shown. However, since the casters in this unit are closer together, tilt-preventing means are provided at the bottom of the unit projecting outwardly from the frame. As in FIG. 12, the unit of FIG. 14 comprises vertical members or legs 111, 112, railing members 113 with brace locking means 114, and bottom cross members 115 connected across the bottom ends of legs 111, 112. Referring to FIG. 15, the extremities 117 of cross member 115 is shown projecting beyond and outwardly of casters 116, the ends of the extremities having rubber caps 118 thereon high enough to avoid door saddles. The unit being more compact than those shown in FIGS. 1 and 12 might rock during weight shifting on platform 119, in which case anti-tilt members 117 would prevent the unit from toppling.

Where the floor upon which the ambulating device is used might be slippery, it may be desirable to utilize a pole capable of assuring gripping with the surface of the floor. One embodiment of such a pole is shown as a fragment in FIG. 17, the end of the pole being shown as a tripod arrangement of legs 120 having rubber caps or suction cups 121, the legs all merging into a socket 122 to which pole 123 is ball joint connected at 124 as shown. As will be apparent from the dotted lines of pole 123, as the pole changes its angle with the floor during manipulation by the patient, legs 120 and rubber caps 121 maintain firm contact with the floor to provide continuous reaction thrust during the pushing stroke.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A device for faciliating in the erect position the mobilization of paraplegics wearing body and leg braces comprising, a rigid framework formed of upright and transverse structural elements supported at the bottom by casters, a horizontal platform at substantially the bottom of said framework, said leg braces being rigidly lockable, means mounted to said framework for lockingly engaging said leg braces, feet restraining means connected to said device, a seating element mounted at the trailing end of said device, said seating element being adjustable in and out of seating position, and an adjustably mountable lap board connected to the framework of said device, the plane of said lap board being capable of being adjustably mounted in the horizontal position and serve as a working table.

2. A device for facilitating in the erect position the mobilization of paraplegics wearing body and leg braces comprising, a rigid framework of substantially rectangular configuration formed of upright and transverse structural elements supported at the bottom by casters, said framework having a leading and a trailing end and side frames connecting said ends, each of said side frames having a side railing as one of the structural elements, a horizontal platform supported inwardly of said leading and trailing ends at substantially the bottom of said framework, said platform being accessible from the trailing end of said framework, said leg braces being rigidly lockable, means connected to each side railing for lockingly engaging said leg braces, feet restraining means connected to said device, a seating element connected to the trailing end of said device, said seating element being adjustable in and out of seating position, an adjustably mountable lap board connected to the frame of said leading end, the plane of said lap board capable of being adjustably mounted in the horizontal position and serve as a working table, and thrust means operable by the user of the device for propelling the same along a floor.

3. A device for facilitating in the erect position the mobilization of paraplegics wearing body and leg braces comprising, a rigid framework of substantially rectangular configuration formed of upright and transverse structural elements supported at the bottom by casters, said framework having a leading and a trailing end and side frames connecting said ends, each of said side frames having a side railing as one of the structural elements, a horizontal platform supported inwardly of said leading and trailing ends at substantially the bottom of said framework, said platform being accessible from the trailing end of said framework, the bottom of said trailing end extending rearward of the framework to provide an extension portion capable of being wheeled under a bed or wheelchair to enable ease of access to a user, said leg braces being rigidly lockable, means connected to each side railing for lockingly engaging said leg braces, feet restraining means connected to the device, and thrust means operable by the user of the device for propelling the same along a floor.

4. A device for facilitating in the erect position the mobilization of paraplegics wearing body and leg braces comprising, a rigid framework of substantially rectangular configuration formed of upright and transverse structural elements supported at the bottom by casters, said framework having a leading and a trailing end and side frames connecting said ends, each of said frames having a side railing as one of the transverse structural elements, a horizontal platform supported inwardly of said leading and trailing ends at substantially the bottom of said framework, said platform being accessible from the trailing end of said framework, anti-tilting means associated with the corners of said device at the bottom thereof, each of said means comprising a structural element projecting outwardly from each corner and downwardly and terminating above the surface supporting said device, said leg braces being rigidly lockable, means associated with each side railing for lockingly engaging said leg braces and feet restraining means connected to the device.

5. A device for facilitating in the erect position the mobilization of paraplegics wearing leg braces comprising, a rigid framework of substantially rectangular configuration formed of upright and transverse structural elements supported at the bottom by casters, said framework having a leading and a trailing end and side frames connecting said ends, each of said frames having a side railing as one of the transverse structural elements, a horizontal platform supported inwardly of said leading and trailing ends near the bottom of said framework, said platform being accessible from the trailing end of said framework, a seating element associated with the framework at substantially the trailing end, said seating element being pivotally connected at one of its ends to a side frame and having means at its opposite end for swingably engaging the seat to the other side frame, an adjustably mountable lap board connected to the frame of said leading end, said lap board being capable of being locked in the horizontal position and serve as a working table, said leg braces being rigidly lockable, means connected to each side railing for lockingly engaging said leg braces, feet restraining means connected to the device for engaging the legs of a paraplegic adjacent his feet, and thrust means operable by the user of the device for propelling the same along a floor.

6. The combination of a body and leg brace structure with a device for facilitating in the erect position the mobilization of paraplegics, said device comprising, a rigid framework of substantially rectangular configuration formed of upright and transverse structural elements supported at the bottom by casters, said framework having a leading and a trailing end and side frames connecting said ends, each of said side frames having a side railing as one of the transverse structural elements, a horizontal platform supported inwardly of said leading and trailing ends near the bottom of said framework, said platform being accessible from the trailing end of said framework, said body and leg brace structure being adapted for use on the platform of said device, each leg brace of said structure being connected to a shoe, and means connected to each side railing for lockingly engaging each of the leg braces.

7. The combination of a body and leg brace structure with a device for facilitating in the erect position the mobilization of paraplegics, said device comprising, a rigid framework of substantially rectangular configuration formed of upright and transverse structural elements supported at the bottom of casters, said framework having a leading and a trailing end and side frames connecting said ends, each of said frames having a side railing as one of the transverse structural elements, a horizontal platform supported inwardly of said leading and trailing ends near the bottom of said framework, said platform being accessible from the trailing end of said framework, said body and leg brace structure being adapted for use on the platform of said device, each leg brace terminating into a foot brace of said structure, a seating element connected to the framework at substantially the trailing end, said seating element being adjustable in the horizontal position, an adjustably mountable lap board connected to the frame of said leading end, the plane of said lap board being capable of being locked in the horizontal position and of serving as a working table, means associated with each said side railing for lockingly engaging each of the leg braces, and feet restraining means connected to said device for engaging the legs of a paraplegic adjacent his feet.

References Cited by the Examiner

UNITED STATES PATENTS

| | | | |
|---|---|---|---|
| 1,712,198 | 5/1929 | Clapp. | |
| 2,005,910 | 6/1935 | Andersen | 280—87.04 |
| 2,058,563 | 10/1936 | Campbell | 128—80 X |
| 2,168,424 | 8/1939 | Skinner et al. | 297—6 |
| 2,210,269 | 8/1940 | Taylor. | |
| 2,369,040 | 2/1945 | Grady | 280—219 |
| 2,423,311 | 7/1947 | Griffin. | |
| 2,433,969 | 1/1948 | Wood | 297—6 |
| 2,604,889 | 7/1952 | Erickson | 128—85 |
| 2,611,363 | 9/1952 | Peters | 128—134 |
| 2,745,465 | 5/1956 | Hogan | 297—6 |
| 2,759,525 | 8/1956 | Ries | 297—6 |
| 3,074,669 | 1/1963 | Bohlin | 297—6 |
| 3,107,105 | 10/1963 | Heriford | 280—42 X |
| 3,137,869 | 6/1964 | Johnson | 5—86 |
| 3,171,407 | 3/1965 | Rogers | 128—80 |

KENNETH H. BETTS, *Primary Examiner.*